B. KEYSER & C. F. INGOLD.
HAND TRUCK.
APPLICATION FILED APR. 27, 1909.
938,872.
Patented Nov. 2, 1909.
3 SHEETS—SHEET 1.
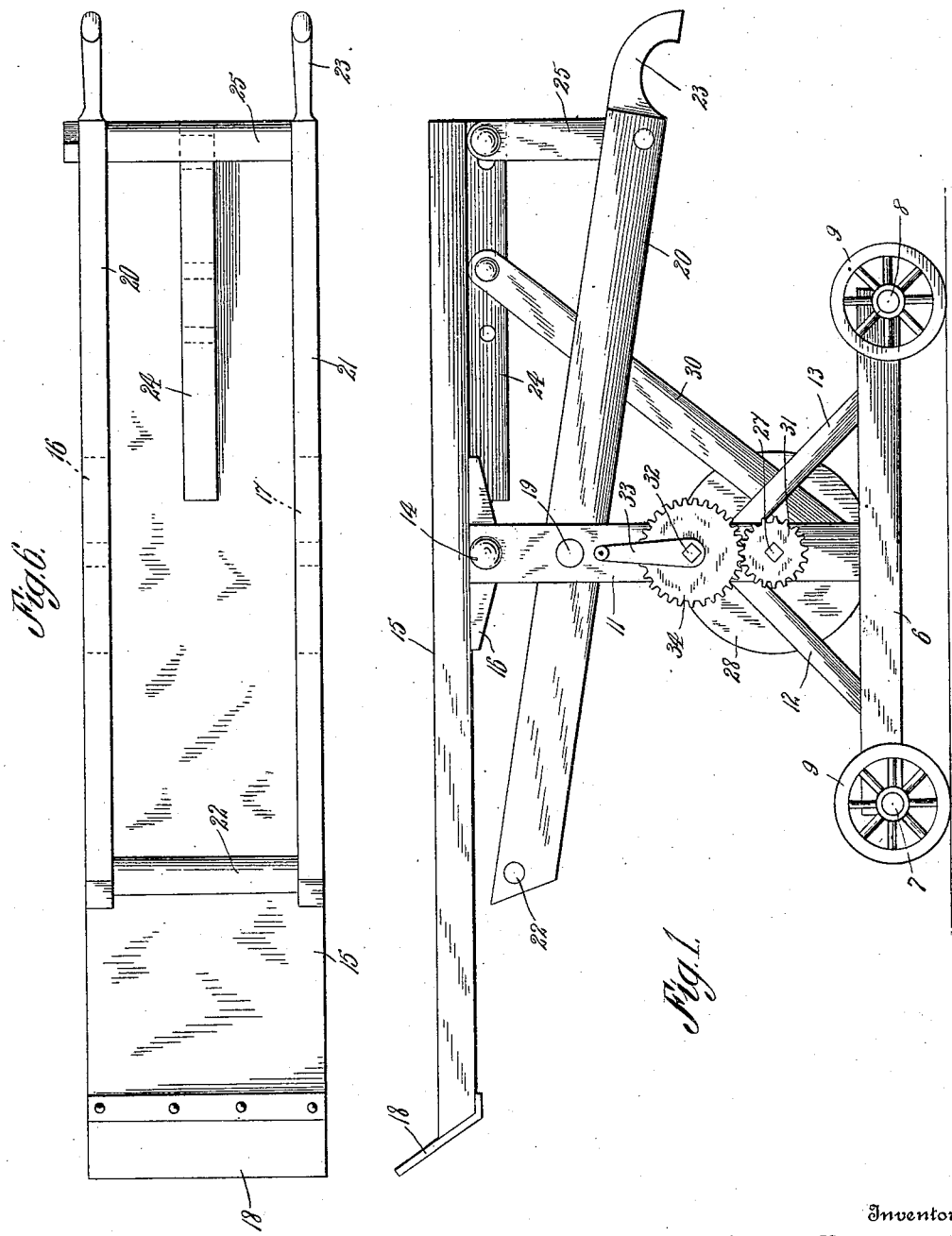
Witnesses
J. H. Crawford
John A. Donegan
Inventors
Byron Keyser,
Clement F. Ingold,
By
Attorneys

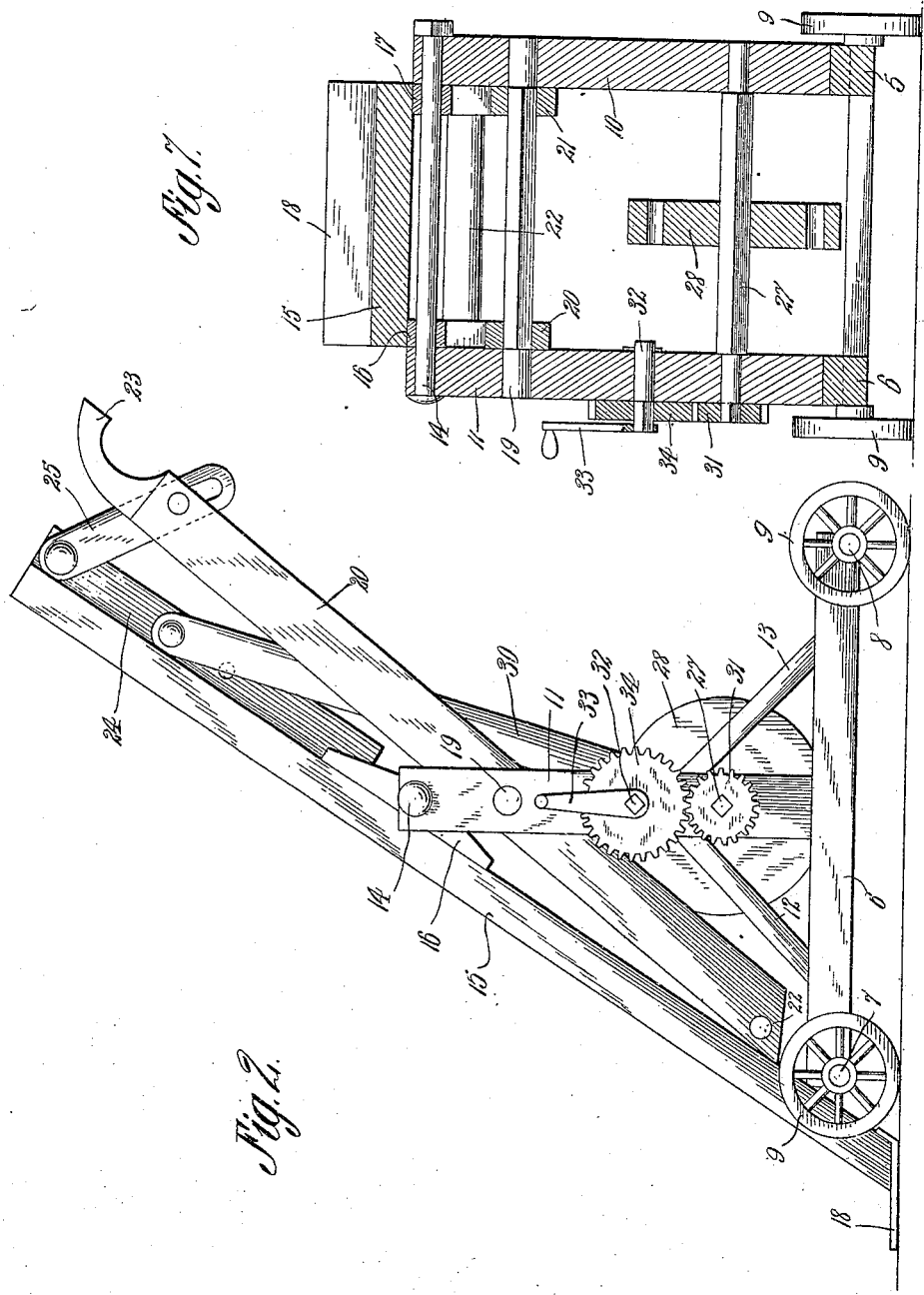

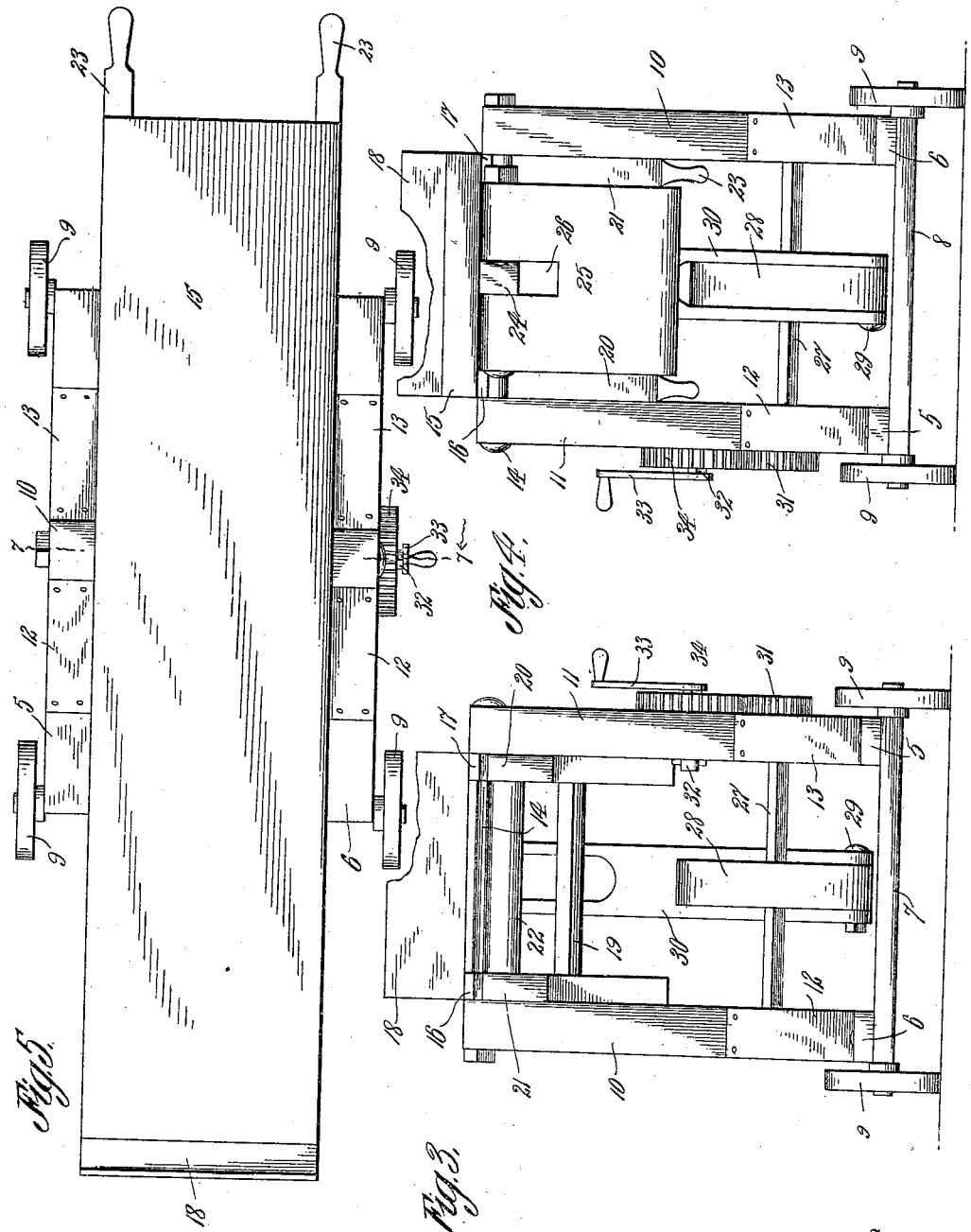

UNITED STATES PATENT OFFICE.

BYRON KEYSER AND CLEMENT F. INGOLD, OF HARTVILLE, OHIO.

HAND-TRUCK.

938,872.

Specification of Letters Patent.

Patented Nov. 2, 1909.

Application filed April 27, 1909. Serial No. 492,449.

*To all whom it may concern:*

Be it known that we, BYRON KEYSER and CLEMENT F. INGOLD, citizens of the United States, residing at Hartville, in the county of Stark, State of Ohio, have invented certain new and useful Improvements in Hand-Trucks; and we do hereby declare the following to be a full, clear, and exact description of the invention, such as will enable others skilled in the art to which it appertains to make and use the same.

This invention relates to improvements in hand trucks and more particularly to the kind employed for lifting and transporting filled sacks, trunks, boxes and the like.

It has for one of its objects the provision of a device of that kind which will facilitate lifting a bag, trunk or the like from its position on the ground on to the track.

Another object is the employment of an improved form of carrying platform which is adapted to be raised and lowered in an easy manner.

A further object is the provision of an improved form of handle which is designed to impart the initial lifting movement to the platform at a point between its fulcrum and weight end.

A still further object is the provision of a connection between the handle and platform by means of which the latter will be depressed by the former bearing on the power end or end remote from the weight end.

With these and other objects in view as will more fully hereinafter appear, the present invention consists in certain novel details of construction and arrangement of parts, hereinafter fully described, illustrated in the accompanying drawings and more particularly pointed out in the appended claims. It being understood that various changes in the form, proportion, size and minor details of the device may be made without departing from the spirit or sacrificing any of the advantages of the invention.

In the accompanying drawings forming part of the specification:—Figure 1 is a side elevation of the device showing the platform in its elevated or carrying position. Fig. 2 is a similar view but showing the platform depressed and in discharging or engaging position. Fig. 3 is a front elevation of the device when the parts are in position as shown at Fig. 1. Fig. 4 is a rear end view. Fig. 5 is a top plan view of the device. Fig. 6 is a bottom plan view of the lifting platform and handle. Fig. 7 is a vertical section taken on the line 7—7, Fig. 5.

Similar numerals of reference are employed to designate corresponding parts throughout.

As shown in the drawings the device comprises a wheeled frame, a platform pivoted thereto and a handle pivoted to the frame beneath the platform. The handle is adapted to raise and lower the platform and the frame performs the function of transporting the platform and its load.

The frame comprises the side sills 5 and 6 which may be of any suitable length and are held in spaced relation and parallel by means of horizontally disposed axles 7 and 8 disposed adjacent the opposite ends of the sills. The free ends of the axles extend beyond the outer sides of the sills and have journaled thereon the bearing wheels 9. Rising from the upper faces of the sills and disposed at the middle thereof are the vertical standards 10 and 11 which are braced against movement by means of the struts 12 and 13. The standards may be of any preferred height and at their upper ends are provided with openings for the reception of a horizontally disposed shaft 14.

The lifting platform is designated by the numeral 15 and is of greater length than the sills 5 and 6, and in the present instance is shown to be provided on its lower face and at its horizontal center with a pair of boxings 16 and 17. These boxings are provided with alining openings for the reception of the shaft 14, it being understood that the platform is of a width to nicely fit between the standards 10 and 11. Thus it can be seen that the shaft 14 constitutes a fulcrum for the platform 15. The engaging end of the platform terminates in a laterally extending shoe 18 which is disposed at an obtuse angle to the platform and is designed to be inserted between the object to be lifted and the ground, therefore that portion of the platform between its fulcrum and the shoe 18 will subsequently be termed the weight side and the opposite end portion of the platform the power side.

By referring now to the drawings it will be seen that a second shaft 19 has its opposite ends disposed in openings formed in the standards 10 and 11 directly below and in a vertical plane with the openings for the shaft 14 and journaled on the second shaft 19 is the handle. This member comprises a frame-like structure of a width sufficient to nicely fit between the standards 10 and 11. The side bars 20 and 21 are connected at one end by means of a cross piece 22 and their opposite ends are rounded so as to form hand grips 23. The side bars are substantially of the same length as the lifting platform 15 and between the ends remote from the hand grips 23 and their horizontal centers are provided with openings for the reception of the shaft 19, whereby the hand grips 23 will extend considerably in advance of the power end of the platform so that when the latter is being tilted it will not strike the operator nor will it interfere with his movements when pulling the truck.

By referring now to the drawings it will be seen that the lower face of the platform 15 is provided with a cleat 24. This member is disposed on the power side of the platform and extends longitudinally of the same and is arranged in alinement with the longitudinal center of the platform. The cleat extends throughout the length of the power side of the platform and at its outer end is connected with the side bars 20 and 21 of the handle by a link 25. The latter is of a width to nicely fit between the side bars 20 and 21 and is disposed adjacent the hand grips 23 and at its upper end is provided with a medially disposed recess 26 for the reception of the cleat 24. A pivot pin extends through the side bars 20 and 21 and through the lower end of the link and a second pivot pin extends through the cleat and upper end of the link, whereby a pivotal connection between the platform and handle is established.

Owing to the disposition of the platform and handle they will move in arcs of different circles and the length of the link is such that when the platform is brought to a position perpendicular to the standards 10 and 11 or in a true horizontal plane the handle will incline downwardly from the end adjacent the shoe 18 of the platform or in other words, lie in a plane oblique to the plane of the platform. This structure, by virtue of the planes of movement of the platform and handle intersecting will cause the weight end of the platform to bear on the corresponding ends of the side bars of the handle when the former is depressed. It might here be stated that the platform will first bear on the side bars when it has completed, approximately, one-half of its downward movement. In order that the platform may descend farther and not bind on the handle it will be observed that the opening in the cleat for the reception of the pivot pin which connects the link to the cleat, is elongated, thus permitting the platform to descend so that the shoe 18 will bear on the ground, by virtue of the pivot pin moving rearwardly in the elongated opening in the cleat. When the platform has reached the limit of its downward movement the ends of the side bars 20 and 21 will bear on its lower face adjacent the shoe 18 so that when the platform and its load is lifted upwardly by bearing on the hand grips 23 the lifting power will be applied by the contacting portions of the side bars with the platform, by virtue of the pivot pin being at the upper end of the elongated opening in the cleat. Thus it will be seen that the initial lifting movement is imparted to the platform on its weight side which will greatly facilitate the work, since it can be readily seen that greater force would be necessary to impart the initial movement to the platform where the handles rigid with the platform or their bearing ends not to engage the latter. As the platform ascends and moves away from the bearing ends of the side bars 20 and 21 the lifting movement is transferred to the link 25 and the power end of the platform, this will not occur, however, until after the platform has raised sufficiently far above the ground that the work of bringing the platform and its load to a horizontal position will be of comparatively little effort to the operator. It will be further observed in this connection that the link performs a further function of preventing the platform and its load from tilting downwardly in either direction after being lifted.

In order to operate the platform to lift a load which it would be impossible for the operator to do by bearing on the hand grips 23 the following construction is employed: By referring now to the drawings it will be seen that a shaft 27 has its opposite ends journaled in the standards 10 and 11 below the handle shaft 19 and keyed to the middle of this shaft is a disk or pulley 28. The latter is provided with an eccentric opening adjacent its periphery which receives a stud 29. Connection between the stud and cleat 24 is established by means of a pitman 30 one end of which is pivoted to the cleat and the opposite end provided with an opening for the loose reception of the stud. In the normal position of the parts the stud 29 will be disposed below and in a vertical plane with the shaft 27, in this position the platform will occupy a horizontal plane. One end of the shaft 27 extends through the standard 11 and has keyed thereto a pinion 31. A shaft 32 has one end journaled in the standard 11 directly above the shaft 27, the opposite end of the shaft 32 extends in advance of the outer face of the standard 11 and terminates in a crank arm 33 and keyed to the shaft 32, is a crown gear 34 which meshes with the pinion 31. Thus it will be seen when the crank handle is turned in one direction the stud 29 will ascend causing the pitman to move upwardly and raises the power end of the platform 15 whereby the opposite or weight end will be depressed. The pulley is of sufficient diameter to permit the platform to descend to its full extent without danger of the parts binding; by now turning the crank handle in the opposite direction the lifting power or leverage will be increased whereby an extremely heavy load can be readily lifted.

From the foregoing it can be seen that we have provided a structure which is comparatively simple and inexpensive to manufacture embodying few parts and these so arranged that the danger of derangement will be reduced to a minimum. The utility of the device will be greatly appreciated by porters, stevedores mill hands and the like since it will expedite the lifting and transportation of trunks, packages, bags and the like.

Having thus described our invention what is claimed as new, is:—

1. In a hand truck, a wheeled frame, a platform pivotally mounted thereon, and a handle pivotally combined with the frame and having one end connected with one end of the platform and its opposite end serving to impart the initial lifting movement to the latter.

2. In a hand truck, a wheeled frame, a platform pivotally mounted thereon, and a pivoted handle combined with the frame and having one end connected with one end portion of the platform and its opposite end bearing on the opposite end of the platform and serving to impart the initial lifting movement to the latter.

3. In a hand truck, a wheeled frame, a platform pivotally mounted thereon, and a pivoted handle combined with the frame having one end bearing on one end portion of the platform when the said end is depressed serving to impart the initial lifting movement to the platform and a connection between the opposite end of the handle and opposite end of the platform, whereby the said opposite end of the handle is enabled to continue the lifting movement of the platform.

4. In a hand truck, a wheeled frame, a platform pivotally mounted thereon, a handle pivoted to the frame below the platform having one end disposed beneath the weight engaging end of the latter and a link connection between the opposite end of the handle and the opposite end of the platform.

5. In a hand truck, a wheeled frame, a platform pivotally mounted thereon, and a pivoted lifting handle pivotally secured at one end to one end of the platform and its opposite end adapted to bear on the opposite end of the platform.

6. In a hand truck, the combination with a wheeled frame, of a horizontally disposed platform pivotally mounted on the frame and a pivoted handle disposed beneath the platform adapted to elevate said platform by bearing on one end and depress the same by bearing on the opposite end.

7. In a hand truck, a horizontally pivoted platform, and a pivoted handle having one end bearing on the platform and disposed in a plane oblique to the plane of the platform when the latter is depressed.

8. In a hand truck, a horizontally pivoted platform, a pivoted handle pivotally connected at its rear end to said platform and disposed in a plane oblique to the plane of the platform when the latter is depressed.

9. In a hand truck, a wheeled frame, a platform pivotally mounted thereon, a shaft journaled in said frame below said platform, a pulley on said shaft provided with an eccentric stud and a pitman connecting said stud with one end portion of said platform and means for rotating said pulley.

10. In a hand truck, a wheeled frame, a platform pivotally mounted thereon, a shaft journaled in said frame below said platform, a pulley keyed to said shaft, a pitman having one end eccentrically pivoted on said pulley and its opposite end pivoted to one end portion of the platform, a gear train combined with one end of said shaft and a crank handle for actuating said gear train.

In testimony whereof, we affix our signatures, in presence of two witnesses.

BYRON KEYSER.
CLEMENT F. INGOLD.

Witnesses:
HARVEY F. AKE,
ALVA L. DEAL.